UNITED STATES PATENT OFFICE.

AUGUSTUS O. BOURN, OF BRISTOL, RHODE ISLAND.

PROCESS OF TREATING FIBROUS RUBBER WASTE.

SPECIFICATION forming part of Letters Patent No. 292,891, dated February 5, 1884.

Application filed May 4, 1881. (No specimens.)

*To all whom it may concern:*

Be it known that I, AUGUSTUS O. BOURN, of Bristol, in the county of Bristol and State of Rhode Island, have invented a certain new and useful Process of Treating Fibrous Rubber Waste for the Recovery of the Rubber or Caoutchouc Therefrom; and I do hereby declare that the following specification is a clear, true, and complete description of my invention.

The term "fibrous rubber waste" includes rubber-cloth scraps and worn-out articles composed of cotton or woolen cloth and rubber, all of which have, so far as my knowledge extends, been only heretofore practically utilized by compounding them in a disintegrated condition with fresh gum compounds, and using the same only in the manufacture of such goods as would admit of the presence of the fibrous material whether in its normal or in a changed condition without disadvantage.

The object of my present invention, which relates to the treatment of rubber waste containing cotton fiber, is to separate the rubber from the fibrous mass, in order that the rubber or caoutchouc may be treated after the manner of crude gum, and thereafter applied to general uses, with or without recompounding the same with fresh gum. This end has heretofore been sought by grinding such fibrous rubber waste and applying drafts of air to remove the fiber after the manner of "winnowing;" but, so far as my experience extends, much of the fiber cannot thereby be removed. It has also been heretofore attempted to separate the cloth from the layers of rubber by hand after the scrap or waste has been long subjected to a boiling process; but this operation is too expensive for practical application, and much of the rubber is unrecovered.

The novel method or process invented by me consists in boiling such fibrous rubber waste, suitably prepared, (preferably by chopping or grinding into small pieces,) in such solutions of acid and water as will liquefy the fiber or change it into a body soluble in water, and leave the rubber practically intact. It is not new to subject fibrous rubber waste to the action of acids or alkalies for the purpose of so far decomposing or changing the character of the fiber and destroying its tenacity that the waste could thereafter be ground to a uniform consistency. When thus treated, the fiber, in its changed condition, remains with the rubber, although it is readily disintegrated, because of its weakened condition, as fully set forth in the United States Letters Patent of C. H. Hayward and Daniel E. Hayward, October 27, 1863, No. 40,407. I employ a solution containing about three or four per cent. of sulphuric acid in treating waste containing cotton-fiber; but my process differs mainly from said prior process of the Haywards, in that I practically dissolve the fiber, or so far change its condition that it is actually removed from the rubber in solution or suspension in a liquid form, instead of merely rotting the fiber and leaving it in the waste. The rubber recovered by my process from unvulcanized waste may be used after the manner of crude rubber, if desired, whereas the product of such waste treated as described by the Haywards was susceptible of use only when combined with about twenty-five per cent. of crude rubber, and this was necessary because of the presence of the disintegrated fiber.

For treating rubber waste containing cotton-fiber, I boil the same in an aqueous solution containing about three to four per cent. of the sulphuric acid of commerce. The boiling operation may be varied as to duration, according to circumstances; but I find that good results can be attained by boiling the same from fifteen to twenty-four hours.

In my practice I find that at the close of the boiling operation the cotton-fiber is completely liquefied, so that after drawing off the solution the residuum is composed of rubber and of course such earthy matters as were contained in the "waste" as would be naturally unaffected by the acid solution. The solution used by me of three to four parts of acid to one hundred parts of water is ample for the purpose stated; but the solution used by the Haywards, as set forth in their Letters Patent, was composed of less than two parts of acid to one hundred parts of water, and it was therefore insufficient for the purpose sought by me, although ample to so far rot or destroy the tenacity of the fiber as to render it readily disintegrated and ground into a homogeneous mass with the rubber, as set forth in said prior Letters Patent of the Haywards. I have stated that the waste is suitably prepared by me for the solution, and preferably by chopping or grinding. Therein economic results accrue both as to time involved for the action of the solution and as to the facility with which the fiber may be liquefied and drawn from the rubber. In said Hayward process the removal of the fiber or its residuum by the solution from the rubber not being contemplated, no such preparatory operations on the waste were involved.

The rubber thus recovered by me, if it be from old or vulcanized waste, may be thereafter treated by any of the well-known devulcanizing processes, if desired.

I do not claim to have discovered that sulphuric-acid solutions as used by me will operate as solvents for cotton fiber, because my invention was in part founded upon my knowledge of the well-known fact that solution of sulphuric acid of proper strength will convert cotton into grape-sugar, which is known to be readily soluble in water; but, so far as I know, I am the first to successfully so employ said well-known solution in the treatment of fibrous rubber waste as to thereby enable the elimination of the cotton fibrous matter in a liquefied form. While it is to be understood that I disclaim the use of such solutions as can merely rot or weaken the fiber—as disclosed, for instance, in the aforesaid Letters Patent of Hayward—it is further to be understood that I also disclaim the use of such strong acid solutions as will practically carbonize the fiber—as, for instance, the acid and acid solutions employed in the process described in the French Letters Patent of Faure, No. 91,665, dated April 3, 1871.

Having thus described my invention, I claim as new and desire to secure by Letters Patent—

1. The process of treating rubber waste containing cotton fiber for the recovery of rubber from said waste by boiling the waste in a solution containing about three or four per cent. of sulphuric acid, substantially as described, whereby the fibrous matter is rendered soluble in water, and is readily removed from the waste with said solution, as set forth.

2. The process of treating rubber waste containing cotton fiber for the recovery of the rubber by chopping or grinding said waste and boiling the same in solutions containing about three or four per cent. of sulphuric acid, substantially as described, whereby the fiber is well exposed to the action of said solution, is rendered soluble in water, and is readily separated from the rubber, as set forth.

3. The process of treating rubber waste containing cotton fiber, substantially as hereinbefore described, by subjecting said waste to the action of sulphuric-acid solutions of sufficient strength to operate as a solvent of the fiber, and enable its removal from the waste with said solvent.

AUGUSTUS O. BOURN.

Witnesses:
HENRY ORME,
OZRO C. BARROWS.